3,155,879
TRIPPING ARRANGEMENT FOR AN ELECTRIC
CIRCUIT BREAKER
Edward J. Casey, Media, and Joseph C. Sofianek, Broomall, Pa., assignors to General Electric Company, a corporation of New York
Filed Dec. 7, 1960, Ser. No. 74,325
6 Claims. (Cl. 317—32)

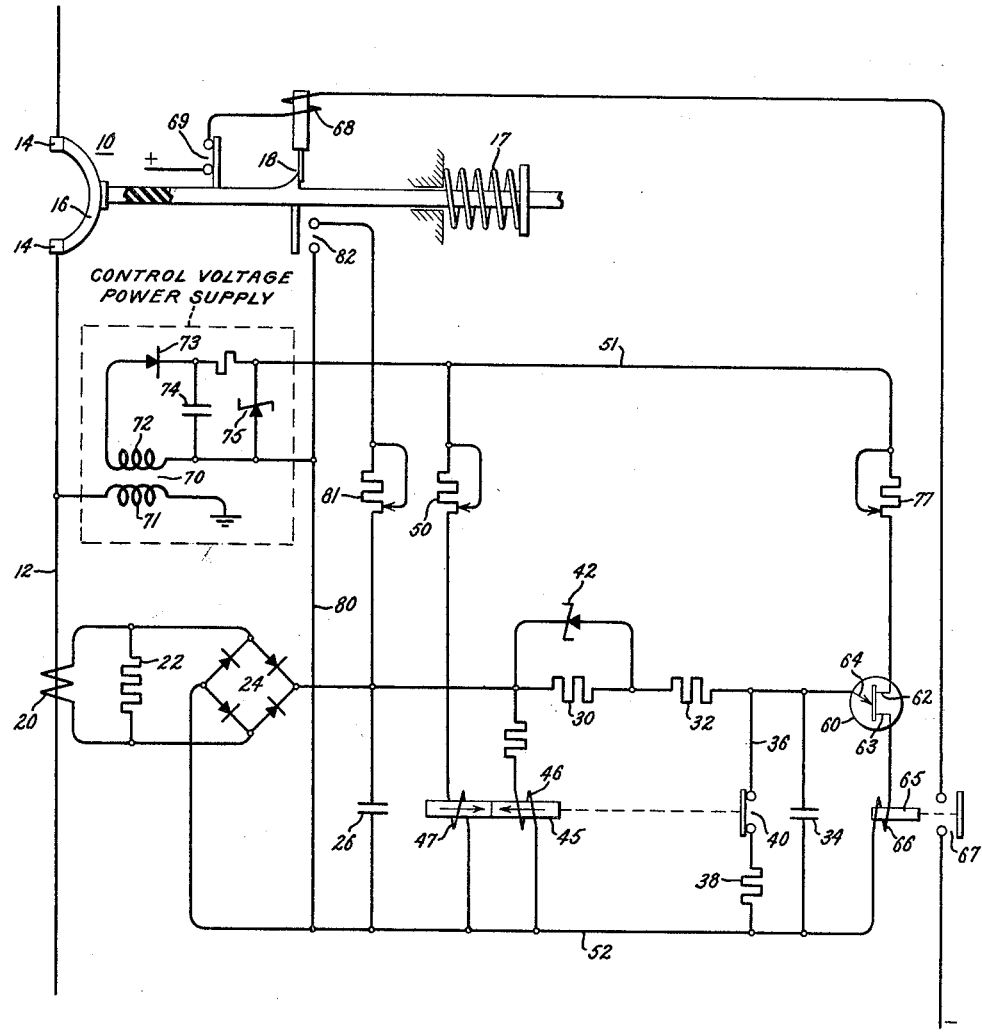

This invention relates to a current-sensitive tripping arrangement for an electric circuit breaker, and, more particularly, to a tripping arrangement that operates to effect tripping of the breaker with a time delay that varies in duration inversely with respect to the magnitude of the current flowing through the breaker.

Conventional time-overcurrent tripping arrangements for circuit breakers have usually employed mechanical or electromechanical devices for controlling the tripping time. Examples of such devices are induction-disc type relays, current responsive devices controlled by dashpots, escapements, or other mechanical timers, and thermally-controlled current-responsive devices. Among the disadvantages of these prior arrangements are: they have required relatively large amounts of input energy; have imposed high burdens on any current transformers used for supplying this input energy; and have been relatively slow in resetting upon termination of the overcurrent condition.

For overcoming these and other difficulties, various types of electronic relaying schemes have been proposed. The time-overcurrent electronic schemes of which we are aware have either been unduly complicated, have not been as reliable or accurate as might be desired, or have not overcome the basic difficulties mentioned hereinabove as well as might be desired.

Accordingly, an object of our invention is to provide, for a circuit breaker tripping arrangement, a time-overcurrent electronic relaying scheme that is simple in construction, reliable and accurate in operation, and is capable of resetting at high speed after termination of the overcurrent condition.

For providing the desired inverse time-current characteristics, the relaying scheme of this invention employs a timing circuit that is normally maintained inactive by a gating device. This gating device is sensitive to current flowing through the power line in which the breaker is connected. When this power current exceeds a predetermined value, the gating device operates to render the timing circuit active so that tripping of the breaker can be effected after a time interval determined by the timing circuit. When the overcurrent condition is terminated, as by operation of the circuit breaker or otherwise, the gating device normally responds by operating to render the timing circuit inactive.

Another object of this invention is to construct the relaying scheme in such a manner that should the gating device fail to respond in its normal intended manner after the over-current condition is terminated, the relaying scheme will not produce a false tripping of the circuit breaker during the flow of normal rated continuous current through the circuit breaker when the circuit breaker is reclosed.

In a preferred form of our invention, certain components of the relaying scheme are normally energized from a control voltage source. If, for some unusual reason, this control voltage source should fail, it would still be important to be able to effect tripping of the circuit breaker under overcurrent conditions, particularly high overcurrents or short circuit conditions. Thus, another object of our invention is to construct a relaying scheme in such a manner that it is still capable of initiating a tripping operation despite such a loss of control voltage.

In carrying out our invention in one form, we provide a circuit breaker for controlling an electric power line. The circuit breaker comprises current-sensing means for deriving from the power line a unidirectional signal voltage that varies as a direct function of the current in the power line. This signal voltage is applied to a normally-inactive timing circuit that includes capacitive means, and an output voltage is derived from the timing circuit that builds up at a rate dependent upon the magnitude of the signal voltage applied thereto once the timing circuit is rendered active. Normally, a low impedance discharge circuit is provided around the capacitive means when the circuit breaker is closed so that the timing circuit is rendered inactive. This discharge circuit is controlled by a gating relay that has a controlling part arranged to be energized by the signal voltage and a set of normally-closed contacts connected in the discharge circuit. When the signal voltage exceeds a predetermined value, the gating relay operates to open its contacts to interrupt the discharge circuit and render the timing circuit active. The build-up in output voltage from the timing circuit is sensed by a level detector, which fires in response to an increase in output voltage to a predetermined level. Means is provided for tripping the circuit breaker in response to firing of the level detector.

In a preferred embodiment of our invention, the voltage required for firing the level detector is lower than the value of signal voltage required to operate the gating relay and is higher than the value of signal voltage that results from the flow through the power line of normal rated continuous current for the circuit breaker.

For a better understanding of our invention, reference may be had to the following description taken in conjunction with the accompanying drawing, wherein the single figure is a diagrammatic showing of a circuit breaker tripping arrangement embodying one form of our invention.

Referring now to the drawing, there is shown an electric circuit breaker 10 for controlling the flow of current through a power line 12. The circuit breaker comprises a set of stationary contacts 14 and a movable bridging contact 16 biased in a direction away from the stationary contacts by a suitable compression spring 17. The circuit breaker is normally maintained in its closed position of the drawing by a suitable trip latch 18 that can be released in a manner soon to be described to permit the spring 17 to separate the contacts 16 and 14 and thereby interrupt the flow of current through power line 12.

The present application is concerned with an arrangement for effecting tripping open of the circuit breaker 10 in response to an overcurrent in power line 12 and, more particularly, is concerned with an arrangement for producing such tripping with a time delay that varies in duration inversely with respect to the magnitude of the overcurrent.

For sensing the magnitude of the current flowing in power line 12, a current transformer secondary winding 20 magnetically coupled to the power line 12 is provided. Connected across the terminals of the current transformer winding 20 is a suitable resistor 22, across which is developed an alternating voltage that is proportional to the current flowing through the current transformer winding 20, and, hence, through the power line 12. The current transformer 20 is so designed that it will not saturate at any currents within the current range which circuit breaker 10 is intended to operate, so that for all such currents the proportional relationship of line current to the voltage developed across resistor 22 will be essentially maintained.

The voltage developed across the resistor 22 is rectified by a conventional rectifying bridge 24 connected across the resistor 22, and the full wave output from this bridge is smoothed by a smoothing capacitor 26 connected across the output terminals of the rectifying bridge. Accordingly, a relatively smooth unidirectional voltage, hereinafter termed the signal voltage, is developed across the terminals of the capacitor 26. This signal voltage is also essentially proportional to the magnitude of the current flowing through power line 12.

For developing a voltage that builds up at a rate that varies directly with respect to the magnitude of the signal voltage once the signal voltage exceeds a predetermined value, a suitable timing circuit connected across the terminals of smoothing capacitor 26 is provided. This timing circuit comprises a plurality of resistors 30 and 32 and a timing capacitor 34, all connected in series circuit relationship when the timing circuit is active. Normally, the timing circuit is rendered inactive by a low impedance discharge circuit 36 shunting the timing capacitor 34 and preventing a significant charge from being built up across the capacitor. This discharge circuit 36 includes a resistor 38 of a low resistance, for example, 100 ohms, and a set of normally-closed contacts 40 connected in series with the resistor 38. The timing circuit is rendered active only when the contacts 40 are opened to interrupt the discharge circuit. This is done in a manner soon to be explained.

Assuming that the timing circuit has been rendered active by opening of contacts 40, then the R-C time constant for the timing circuit at relatively low values of signal voltage is the sum of the resistances of resistors 30 and 32 times the capacitance of capacitor 34. This constant is preferably such that output voltage builds up across the timing capacitor 34 at a rate generally proportional to the magnitude of the overcurrent. At higher values of signal voltage, the voltage drop across the resistor 30 is limited to a predetermined fixed value by a Zener diode 42 of a conventional design connected in shunt with the resistor 30 and in series with the resistor 32. In a conventional manner, the Zener diode 42 breaks down at a predetermined voltage and limits the voltage drop across its terminals to essentially this value of voltage. This breakdown of the Zener diode at the higher values of signal voltage reduces the effective resistance in the timing circuit and thus lowers the R-C time constant of the circuit. The resistors of the timing circuit are preferably of such a size that under these high signal voltage conditions (when the Zener diode is regulating the voltage drop across resistor 30), the output voltage builds up across capacitor 34 to a preselected critical level (soon to be described) in a period of time that is approximately inversely proportional to the square of the current in power line 12. The use of a Zener diode in this manner for varying the R-C time constant of the timing circuit forms no part of our own invention and is disclosed and claimed in application Serial Number 138,476, Dewey, filed September 15, 1961, now Patent 3,105,920, and assigned to the assignee of the present invention.

For rendering the timing circuit active when the current in power line 12 exceeds a predetermined value, a gating relay 45 having an operating coil 46 connected across the terminals of the smoothing capacitor 26 is provided. This gating relay includes the aforementioned normally closed contacts 40 that are connected in the discharge circuit 36 around the timing capacitor 34. When the signal voltage developed across capacitor 26 exceeds a predetermined value, the coil 46 of the relay becomes sufficiently energized to cause the relay to operate and open its contacts 40. This removes the discharge circuit 36 from around the timing capacitor 34 and thus allows the timing capacitor to begin its timing function, i.e., renders the timing circuit active. Since no significant charge was permitted to build up on the timing capacitor prior to operation of the gating relay, it will be apparent that inaccuracies in timing that could have resulted from such a premature charge have been eliminated.

Preferably the relay 45 is a sensitive polarized relay of conventional construction having a restraining winding 47 connected across a source of control voltage (soon to be described) of a predetermined fixed value. This restraining winding 47 provides a bias of a definite predetermined value tending to hold the contacts 40 closed. It is only when the signal voltage exceeds the voltage across the restraining winding 47 by a predetermined amount that the relay 45 operates to open its contacts 40. The restraining winding 47 is preferably connected in series with a rheostat 50 that can be adjusted to adjust the pickup value of relay 45. In this regard, the adjustment of rheostat 50 changes the voltage drop across restraining winding 47 and thus produces a corresponding change in the biasing force tending to hold the contacts 40 closed. It will be apparent from the drawing that one terminal of the circuit that includes the rheostat 50 and the restraining winding 47 is connected to the positive bus 51 of the control voltage source and the other terminal is connected to a negative bus 52.

In a preferred form of our invention, the signal voltage required for picking up the gating relay 45 is 10 volts. In this preferred form, when a current equal to the normal continuous current rating of the circuit breaker 10 flows through the power line 12, the signal voltage developed across the capacitor 26 is 5 volts. Thus, under normal conditions the polarized relay 45 remains in its non-operated position of the drawing. It is only when the current through power line 12 exceeds twice normal current that a sufficient signal voltage (10 volts) is developed to operate the gating relay 45.

For tripping the circuit breaker 10 when the output voltage from the timing circuit reaches a predetermined value, a level detector 60 in the form of a silicon unijunction transistor is provided. This unijunction transistor 60 is of a conventional form, such as disclosed and claimed in U.S. Patent No. 2,769,926—Lesk, assigned to the assignee of the present invention, and it will therefore be explained only in sufficient detail to provide an understanding of the present invention. Referring now to the unijunction transistor 60, 62 and 63 represent the two bases of the transistor, and 64 represents the emitter of the transistor. So long as the voltage between the emitter 64 and the lower base 63 is below a certain critical value, called the peak point emitter voltage, a very high resistance is present between the emitter and the two bases, and therefore no significant amount of current flows in the circuit of emitter 64. However, when the emitter voltage is increased to this critical peak point emitter voltage, the transistor 60 fires, i.e., the resistance between its emitter 64 and base 63 suddenly drops, allowing greatly increased current to flow from the emitter 64 through the base 63. This greatly increased current is derived from the timing capacitor 34, which, in response to firing of the transistor 60, quickly discharges through the circuit including the emitter 64 and the base 63. Connected in series-circuit relationship with the lower base 63 is the coil 66 of a tripping relay 65. The abruptly increased current that flows through the base 63 in response to firing of the transistor 60 also flows through this coil 66, causing the relay 65 to pick up and close its contact 67. Closing of the contact 67 completes a tripping circuit through a trip coil 68 of the latch 18. The trip coil 68 responds by releasing the latch 18 to allow the breaker 10 to open under the bias of its opening spring 17. When the breaker 10 opens, a switch 69 connected in the tripping circuit opens to interrupt the tripping circuit. The power source for the tripping circuit has not been shown in the drawing since it can be of any suitable conventional form. It is believed sufficient simply to illustrate this power circuit as connected between the positive and negative terminals of such a source.

In the preferred form of my invention, the output voltage from the timing circuit, i.e., the voltage across the timing capacitor 34, must reach 7 volts before the voltage between emitter 64 and base 63 reaches the critical peak point emitter voltage required to fire the unijunction transistor 60. This output voltage from the timing circuit, it will be observed, is less than the signal voltage across smoothing capacitor 26 required to pick up gating relay 45 (10 volts), but is greater than the value of signal voltage (5 volts) that results from normal rated current flowing in the power line 12. Though the specific values of voltage are not important, their relationship to each other is. In this connection, if the gating relay 45 should for some unusual reason become stuck in its operated position, it would still be desirable that it be possible to reclose the circuit breaker without having it trip in response to relatively low values of current in the power line 12. By having the emitter voltage required for firing of the unijunction transistor 60 higher than the emitter voltage that would result from normal rated current, firing of the transistor 60 and hence tripping of the breaker 10 can be prevented under such conditions. More specifically, if normal rated current results in a signal voltage of only 5 volts, then the maximum output voltage from the timing circuit will be only 5 volts, a value too low to fire the unijunction transistor 60. Preventing false tripping of the circuit breaker under these conditions in this manner contributes substantially to the reliability of our relaying scheme.

By requiring that the emitter voltage needed to fire the unijunction transistor 60 be less than the voltage required to pick up the gating relay 45, we can provide reasonable assurance that pickup of the gating relay 45 will produce tripping of the circuit breaker 10 if the overcurrent condition responsible for pickup of gating relay 45 remains for a sufficient length of time. If the pickup values of gating relay 45 were lower instead of higher than the emitter firing voltage, then it would be possible for an initial charge to be built up on the timing capacitor during the interval when the gating relay 45 was picked up but no tripping of the breaker was desired. This initial charge could interfere with proper timing once the current through line 12 reached a high enough level to produce tripping of the breaker.

The control voltage that is impressed across the two bases of the unijunction transistor 60 can be derived from any suitable source, but in the preferred form of our invention disclosed, it is derived from a potential transformer 70 connected to the power line 12. This potential transformer has a primary winding 71 connected between the power line 12 and ground and a secondary winding 72 having one of its terminals connected to negative bus 52. The output from the secondary winding 72 is rectified by suitable rectifier 73 connected in circuit with the secondary winding 72, and this output is smoothed by smoothing capacitor 74 connected in series with the rectifier 73. A Zener diode 75 is connected across the terminals of the capacitor 74 to regulate the voltage developed across the capacitor 74. The maximum voltage that the Zener diode allows to be developed across its terminals is below the minimum voltage that would have been developed across the capacitor 74 in the absence of the Zener diode, and as a result the Zener diode continuously limits this voltage and thus holds it at a fixed level. The voltage developed across the Zener diode 75 may be thought of as the control voltage. In a preferred form of our invention, this control voltage is 12 volts. The positive bus 51 extends from the control voltage source, and the series combination of the unijunction transistor 60, a biasing resistor 77, and the operating winding 66 of relay 65 are connected between this positive bus 51 and the negative bus 52, so as to be normally energized by the constant control voltage. Preferably, the biasing resistor 77 is adjustable so as to permit adjustments in the amount of emitter voltage required to fire the transistor 60.

A known characteristic of the unijunction transistor is that its effective resistance to the flow of emitter current becomes very low if no voltage is present across its two bases (62 and 63). We utilize this characteristic to increase the reliability of our relaying scheme. More particularly, if for any reason, no control voltage should be available, then the transistor would present negligible impedance between emitter 64 and the base 63. If a heavy overcurrent developed during this interval when no control voltage was available, pick-up of the gating relay 45 would result in a circuit that included the resistors 30 and 32 connected in series with the winding 66 across the terminals of the smoothing capacitor 26. The total impedance of this circuit that includes resistors 30 and 32 and the winding 66 is such that for high values of signal voltage (resulting from overcurrents through power line 12 within the interrupting ability of breaker 10) enough current flows through this circuit 30, 32, 64, 63, 66 to pick up the relay 65 to effect tripping. Thus, tripping can be effected with our disclosed arrangement for overcurrents within the breaker's interrupting ability even when there is no control voltage available. The total impedance of the circuit 30, 32, 64, 63, 66 can be of such a value under these no-control-voltage conditions that tripping can be effected at any desired level of overcurrent in the power line 12 above that needed to pick up gating relay 45.

The above discussion of tripping when no control voltage is present assumes that energy is available to energize and operate the trip device 18 when the tripping relay 65 is closed. Such energy can be derived from any suitable conventional source (not shown) and would have to be available even at times when no control voltage was available if tripping in the above-described manner were to be accomplished. In many circuits, including our control voltage power supply circuit, it is not generally practical to derive the control voltage from the same energy source as tripping power because of the widely different time constants required for the control voltage supply and the tripping power supply.

An important advantage of our relay is its ability to reset to its normal-at-rest condition quickly after any overcurrent flowing through power line 12 has been terminated. In this regard, if the gating relay 45 picks up and causes tripping of the circuit breaker in the manner described hereinabove, this relay 45 will quickly reset after circuit breaker tripping. This follows from the fact that tripping interrupts the flow of current through power line 12, causing the signal voltage across the terminals of the operating coil 46 to sharply drop to a value below the drop-out value of the relay 45. When the relay 45 thus drops out, it closes its contacts 40 and permits the tripping capacitor 34 to discharge quickly through the discharge circuit 36, so as to prepare the capacitor for another timing operation.

To accelerate drop-out of the gating relay 45 after tripping of the circuit breaker 10 occurs, we have provided a discharge circuit 80 for the smoothing capacitor 26. This discharge circuit 80 is connected around the terminals of the capacitor 26 and includes a low ohmic resistor 81 and a set of contacts 82 that are open when the circuit breaker is closed and are closed in response to opening of the circuit breaker. When the circuit breaker is tripped, the contacts 82 close, completing the discharge circuit 80 and permitting quick discharge of the smoothing capacitor 26. By allowing the capacitor to discharge primarily through this discharge circuit 80 instead of primarily through the operating winding 46 of the gating relay, there is no problem of such discharge current delaying drop-out of the relay 45.

If a relatively low overcurrent had caused the gating relay to pick up and had terminated before tripping occurred, the smoothing capacitor 26 would respond by discharging through the operating coil 46 of the gating relay, but this would not objectionably retard resetting of the gating relay 45 because the charge on the capacitor 26 during such low overcurrents is relatively small and can be dissipated relatively quickly.

By constructing our tripping arrangement in such a manner that the low impedance discharge circuit 36 is present around the timing capacitor 34 at all times when the timing circuit is inactive, we can assure that no significant charge will have built up on this timing capacitor before it is desired that the timing operation begin. Effectively eliminating such premature charging of the capacitor contributes materially to the accuracy of the timing circuit in providing the desired inverse time-current response. This accuracy is a factor of considerable importance from the standpoint of coordinating the tripping of various circuit breakers which might be connected in the power line 12.

While the illustrated embodiment of our invention relies upon an electromagnetic type tripping relay for initiating tripping in response to firing of the level detector 60, it is to be understood that other types of electrically-responsive switches can equally well be used for initiating tripping in response to firing of the level detector, e.g., a silicon controlled rectifier.

While we have shown and described a particular embodiment of our invention, it will be obvious to those skilled in the art that various changes and modifications may be made without departing from our invention in its broader aspects and we, therefore, intend in the appended claims to cover all such changes and modifications as shall fall within the true spirit and scope of our invention.

What we claim as new and desire to secure by Letters Patent of the United States is:

1. An electric circuit breaker for controlling a power line comprising current-sensing means for deriving from said power line a unidirectional signal voltage having a magnitude varying as a direct function of the magnitude of current in said power line, a normally-inactive timing circuit including capacitive means for developing an output voltage that builds up at a rate dependent upon the magnitude of the input voltage applied to the timing circuit once said timing circuit is rendered active, means for applying said signal voltage to said timing circuit as an input voltage, means normally providing a low impedance discharge circuit around said capacitive means when said circuit breaker is closed to render said timing circuit inactive, a gating relay having a controlling part arranged to be energized by said signal voltage and a set of normally-closed contacts connected in said discharge circuit, said gating relay being operable in response to an increase in said signal voltage to a predetermined value to open said contacts to interrupt said discharge circuit and render said timing circuit active, a level detector that fires in response to an increase in said output voltage to a predetermined level, and means for tripping said circuit breaker to open in response to firing of said level detector, said gating relay being responsive to a drop in said signal voltage below said predetermined value to reclose said contacts and reestablish said discharge circuit, said gating relay operating to open said contacts at a higher level of voltage than the predetermined voltage required for firing said level detector, the voltage required for firing said level detector being higher than the value of output voltage resulting from application to said timing circuit when active of the signal voltage that results from the flow of current through said power line equal to the normal continuous current rating of said circuit breaker.

2. An electric circuit breaker for controlling a power line comprising current-sensing means for deriving from said power line a unidirectional signal voltage having a magnitude varying as a direct function of the magnitude of current in said power line, a normally-inactive timing circuit including capacitive means for developing an output voltage that builds up at a rate dependent upon the magnitude of the input voltage applied to the timing circuit once said timing circuit is rendered active, means for applying said signal voltage to said timing circuit as an input voltage, means normally providing a low impedance discharge circuit around said capacitive means when said circuit breaker is closed to render said timing circuit inactive, a gating relay having a controlling part arranged to be energized by said signal voltage and a set of normally-closed contacts connected in said discharge circuit, said gating relay being operable in response to an increase in said signal voltage to a predetermined value to open said contacts to interrupt said discharge circuit and render said timing circuit active, a level detector that fires in response to an increase in said output voltage to a predetermined level, and means for tripping said circuit breaker to open in response to firing of said level detector, said gating relay being responsive to a drop in said signal voltage below said predetermined value to reclose said contacts and reestablish said discharge circuit, said current-sensing means producing a signal voltage of a predetermined normal value when the current flowing through said power line is equal to the rated continuous current of said circuit breaker, the voltage required for firing said level detector being higher than the value of output voltage from said timing circuit resulting from the application to said timing circuit while active of said predetermined normal value of signal voltage, and said gating relay operating at a higher value of signal voltage than the signal voltage that will cause firing of said level detector if applied to said timing circuit when active.

3. An electric circuit breaker for controlling a power line comprising current-sensing means for deriving from said power line a unidirectional signal voltage having a magnitude varying as a direct function of the magnitude of current in said power line, a normally-inactive timing circuit including capacitive means for developing an output voltage that builds up at a rate dependent upon the magnitude of the input voltage applied to the timing circuit once said timing circuit is rendered active, means for applying said signal voltage to said timing circuit as an input voltage, means for normally rendering said timing circuit inactive when said circuit breaker is closed, gating means responsive to an increase in signal voltage to a predetermined value to render said timing circuit active, a level detector having a first electrode to which said output voltage is applied and second and third electrodes across which control voltage is normally applied, said level detector being adapted to fire when the output voltage applied to said first electrode increases to a predetermined level while said control voltage is present across said second and third electrodes, means for tripping said circuit breaker to open in response to firing of said level detector comprising a trip-controlling part connected in series with said second electrode of said level detector, said level detector being of such a character that loss of said control voltage results in a reduction of the impedance between said first and second electrodes to such an extent that said trip-controlling part and said first and second electrodes are effectively connected in series with said current-sensing means, the impedance of said trip-controlling part and the other elements connected in series therewith during the period of lost control voltage being of such values that overcurrents through said power line within the interrupting ability of said circuit breaker during the period of lost control voltage produce sufficient current flow through the series combination of said first and second electrodes and said trip-controlling part to cause said trip-controlling part to effect tripping of said circuit breaker.

4. An electric circuit breaker for controlling a power line comprising current-sensing means for deriving from said power line a unidirectional signal voltage having a magnitude varying as a direct function of the magnitude of current in said power line, a normally-inactive timing circuit including capacitive means for developing an output voltage that builds up at a rate dependent upon the magnitude of the input voltage applied to the timing circuit once said timing circuit is rendered active, means for applying said signal voltage to said timing circuit as an input voltage, means for normally rendering said time circuit inactive when said circuit breaker is closed, gating means responsive to an increase in signal voltage to a predetermined value to render said timing circuit active, a level detector comprising a unijunction transistor having an emitter electrode to which said output voltage is applied and spaced-apart base electrodes across which control voltage is applied, said unijunction transistor being adapted to fire when the output voltage applied to said emitter increases to a predetermined level while said control voltage is present across said base electrodes, means for tripping said circuit breaker to open in response to firing of said unijunction transistor comprising a trip-controlling part connected in series with said emitter and one of said base electrodes, the impedance between said emitter and said one base electrode dropping to such a level in response to loss of control voltage that said trip-controlling part, said emitter and said one base electrode are effectively connected in series with said current-sensing means, the impedance of said trip-controlling part and the other elements connected in series therewith during the period of lost control voltage being of such values that heavy overcurrents in said power line during the period of lost control voltage produce sufficient current flow through the series combination of said emitter, said one base, and said trip-controlling part to cause said trip-controlling part to effect tripping of said circuit breaker, said overcurrents being within the interrupting ability of said circuit breaker.

5. An electric circuit breaker for controlling a power line comprising current-sensing means for deriving from said power line a unidirectional signal voltage having a magnitude varying as a direct function of the magnitude of current in said power line, a normally-inactive timing circuit including capacitive means for developing an output voltage that builds up at a rate dependent upon the magnitude of the input voltage applied to the timing circuit once said timing circuit is rendered active, means for applying said signal voltage to said timing circuit as an input voltage, means normally providing a low impedance discharge circuit around said capacitive means when said circuit breaker is closed to render said timing circuit inactive, a gating relay having a controlling part arranged to be energized by said signal voltage and a set of normally-closed contacts connected in said discharge circuit, said gating relay being operable in response to an increase in said signal voltage to a predetermined value to open said contacts to interrupt said discharge circuit and render said timing circuit active, a level detector that fires in response to an increase in said output voltage to a predetermined level, means for tripping said circuit breaker to open in response to firing of said level detector, said current-sensing means comprising a rectifier and a smoothing capacitor connected in circuit with said rectifier to smooth said signal voltage, a normally-open discharge circuit connected across said smoothing capacitor when said circuit breaker is closed, and means responsive to tripping open of said circuit breaker for completing said discharge circuit to effect quick discharge of said smoothing capacitor and quick reset of said gating relay.

6. An electric circuit breaker for controlling a power line comprising current-sensing means for deriving from said power line a unidirectional signal voltage having a magnitude varying as a direct function of the magnitude of current in said power line; a normally-inactive timing circuit including capacitive means for developing an output voltage that builds up at a rate dependent upon the magnitude of the input voltage applied to the timing circuit once said timing circuit is rendered active; means for applying said signal voltage to said timing circuit as an input voltage; means normally providing a low impedance discharge circuit around said capacitive means when said circuit breaker is closed to render said timing circuit inactive; a gating relay having a controlling part arranged to be energized by said signal voltage and a set of normally-closed contacts connected in said discharge circuit; said gating relay being operable in response to an increase in said signal voltage to a predetermined value to open said contacts to interrupt said discharge circuit and render said timing circuit active; a level detector that fires in response to an increase in said output voltage to a predetermined level; means for tripping said circuit breaker to open in response to firing of said level detector; said gating relay being responsive to a drop in said signal voltage below said predetermined value to reclose said contacts and reestablish said discharge circuit; said level detector comprising a unijunction transistor having two bases and an emitter; said means for tripping the circuit breaker comprising a trip-control element connected in series with one of said bases; and said capacitive means being connected across said emitter, said one base, and said trip-control element so that firing of said unijunction transistor in response to an increase in said output voltage to said predetermined level establishes a discharge circuit for said capacitive means through said emitter, said one base and said trip-control element.

References Cited by the Examiner
UNITED STATES PATENTS

| | | | |
|---|---|---|---|
| 2,769,926 | 11/56 | Lesk | 317—235 |
| 2,920,242 | 1/60 | Koss | 317—27 |
| 2,947,916 | 8/60 | Beck | 317—148.5 |
| 2,977,510 | 3/61 | Adamson | 317—36 |

SAMUEL BERNSTEIN, *Primary Examiner.*